United States Patent
Mann et al.

(10) Patent No.: US 8,787,382 B2
(45) Date of Patent: Jul. 22, 2014

(54) PER-PEER REQUEST DELIVERY TIMEOUTS

(75) Inventors: Robert Alexander Mann, Ottawa (CA); Eric Colaviti, Courcouronnes (FR)

(73) Assignee: Alcatel Lucent, Boulogne Billancourt (FR)

( * ) Notice: Subject to any disclaimer, the term of this patent is extended or adjusted under 35 U.S.C. 154(b) by 100 days.

(21) Appl. No.: 13/536,354

(22) Filed: Jun. 28, 2012

(65) Prior Publication Data

US 2014/0003431 A1 Jan. 2, 2014

(51) Int. Cl.
*H04L 12/56* (2006.01)

(52) U.S. Cl.
USPC .......................................................... 370/392

(58) Field of Classification Search
CPC ..................................................... H04L 29/00
USPC ................................................. 370/254–350
See application file for complete search history.

(56) References Cited

U.S. PATENT DOCUMENTS

| 8,578,050 | B2 * | 11/2013 | Craig et al. | 709/238 |
| 8,644,324 | B2 * | 2/2014 | Kanode et al. | 370/401 |
| 2012/0155389 | A1 * | 6/2012 | McNamee et al. | 370/328 |
| 2012/0258686 | A1 * | 10/2012 | Kurokawa et al. | 455/410 |

* cited by examiner

*Primary Examiner* — Ayaz Sheikh
*Assistant Examiner* — Debebe Asefa
(74) *Attorney, Agent, or Firm* — Kramer Amado, P.C.

(57) ABSTRACT

A method for per-peer request delivery timeouts includes receiving a DIAMETER message at a DIAMETER Routing Agent, testing if the DIAMETER message is a request message destined for an associated peer, and if said test is affirmative, then retrieving a preset timeout associated with that peer; initiating a timeout timer with said preset timeout; and forwarding the DIAMETER request message to said peer. The disclosure provides additional steps with respect to stopping the timer in the event that a response message is received prior to the timer expiring; or alternatively, either resending the request or providing an unable_to_deliver response in the event the timer does expire. The method for per-peer request delivery timeouts provides for fine tuning timeout periods according to the networks to which the DIAMETER peers are connected. The method is particularly useful for reducing the amount of time waiting for response messages which will not be forthcoming.

13 Claims, 5 Drawing Sheets

PER-PEER REQUEST DELIVERY TIMEOUTS

FIELD OF THE INVENTION

The invention relates to generally to network failures to respond to a request and is particularly concerned with lack of responses to a request message in a DIAMETER protocol network.

BACKGROUND OF THE INVENTION

Since its proposal in Internet Engineering Task Force (IETF) Request for Comments (RFC) 3588, the DIAMETER protocol has been increasingly adopted by numerous networked applications. For example, the Third Generation Partnership Project (3GPP) has adopted DIAMETER for various policy and charging control (PCC), mobility management, and IP multimedia subsystem (IMS) applications. As IP-based networks replace circuit-switched networks, DIAMETER is even replacing SS7 as the key communications signaling protocol. As networks evolve, DIAMETER is becoming a widely used protocol among wireless and wireline communications networks.

3GPP Network nodes communicate using DIAMETER commands and to maintain extensibility, typically use a DIAMETER command dictionary to provide the format of commands and Attribute Value Pairs (AVPs).

One significant aspect of the DIAMETER protocol is DIAMETER packet routing. Entities referred to as DIAMETER routing agents (DRAs) facilitate movement of packets in a network. In various deployments, DRAs may perform elementary functions such as simple routing, proxying, and redirect.

SUMMARY OF THE INVENTION

It is an object of the invention to provide a method for associating specific timeout values on a DIAMETER Routing Agent per-peer basis.

According to an aspect of the invention there is provided a method performed by a DIAMETER Routing Agent (DRA) for processing a DIAMETER message associated with peer of the DRA, the method including: receiving the DIAMETER message at the DRA; testing if the DIAMETER message is a request message destined for an associated peer, and if the test is affirmative, then retrieving a preset timeout associated with that peer; initiating a timeout timer with the preset timeout; and forwarding the DIAMETER request message to the peer.

In some embodiments of the invention, upon the event that the timeout timer times out, there is the additional step of taking a preselected timeout action.

In some of these embodiments the preselected timeout action includes resending the DIAMETER request message to the peer; restarting a timeout counter with the preset timeout; and flagging that the timer has expired once.

In others of these embodiments the preselected timeout action includes sending an unable_to_deliver response message.

In other embodiments in the event that the the test step evaluates to the negative, there are the additional steps of testing if the DIAMETER message is a response message from a peer with a running timeout timer, and if the answer is affirmative then, stopping the running timeout timer; and process the response message.

According to yet another aspect of the invention there is provided a non-transitory machine readable storage medium encoded with instructions for execution by a DIAMETER Routing Agent (DRA) for processing a DIAMETER message associated associated with a peer of the DRA, the medium having: instructions for receiving a DIAMETER message at the DRA; instructions for testing if the DIAMETER message is a request message destined for an associated peer, and if the test is affirmative, then instructions for retrieving a preset timeout associated with that peer; instructions for initiating a timeout timer with the preset timeout; and instructions for forwarding the DIAMETER request message to the peer.

Note: in the following the description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

BRIEF DESCRIPTION OF THE DRAWINGS

The present invention will be further understood from the following detailed description of embodiments of the invention, with reference to the drawings in which like reference numbers are used to represent like elements, and.

DETAILED DESCRIPTION

Figure 1:
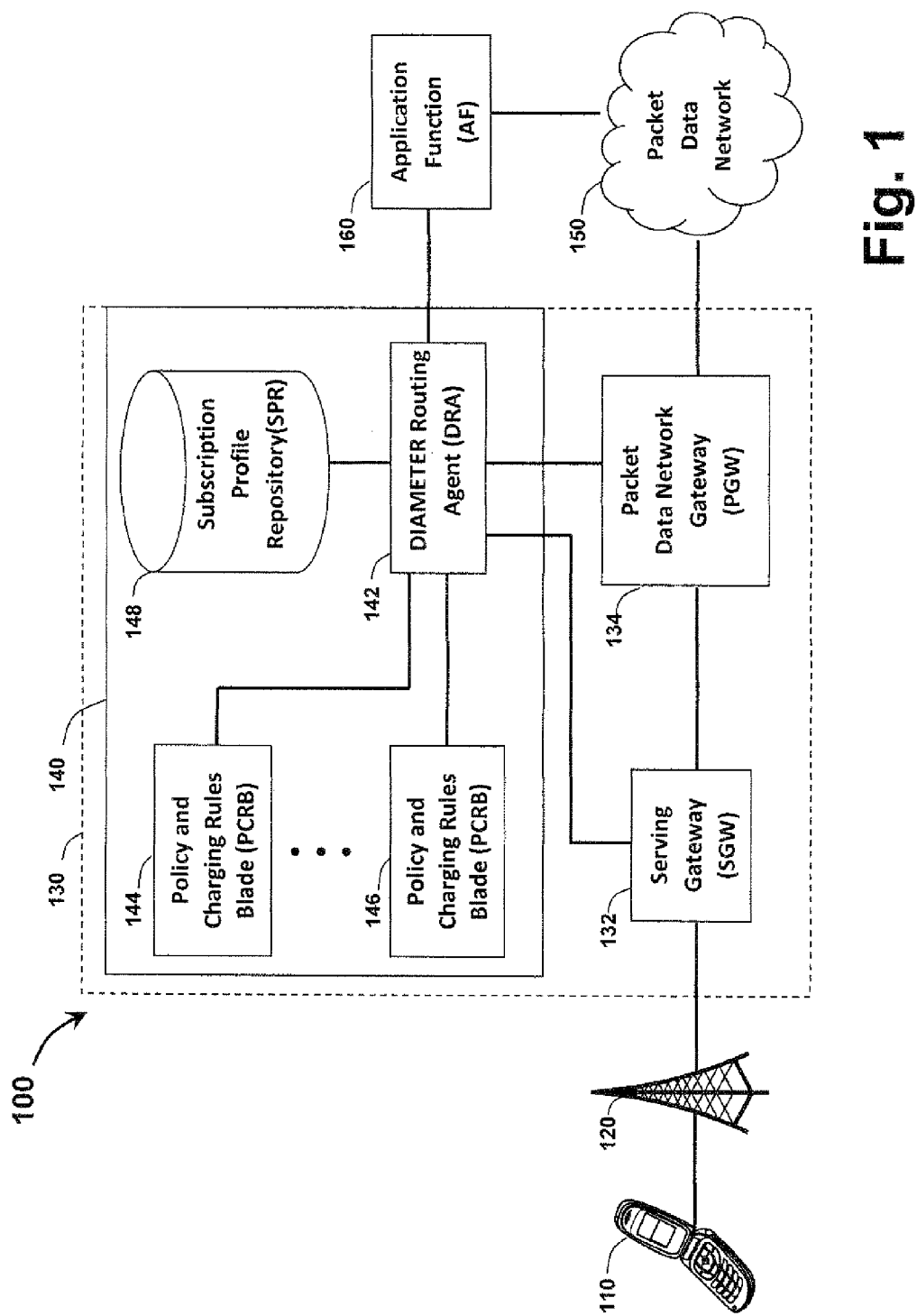
FIG. 1 illustrates an exemplary network environment for a Diameter Routing Agent.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, cooperate or interact with each other. "Connected" is used to indicate the establishment of communication between two or more elements that are coupled with each other.

The techniques shown in the figures can be implemented using code and data stored and executed on one or more electronic devices (e.g., a network element). Such electronic devices store and communicate (internally and with other electronic devices over a network) code and data using machine-readable media, such as machine storage media (e.g., magnetic disks; optical disks; random access memory; read only memory; flash memory devices) and machine communication media (e.g., electrical, optical, acoustical or other form of propagated signals—such as carrier waves, infrared signals, digital signals, etc.). In addition, such electronic devices typically include a set of one or more processors coupled to one or more other components, such as a storage device, one or more user input/output devices (e.g., a keyboard and/or a display), and a network connection. The coupling of the set of processors and other components is typically through one or more busses and bridges (also termed as bus controllers). The storage device and signals carrying the network traffic respectively represent one or more machine storage media and machine communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software that communicatively interconnects other equipment on the network (e.g., other network elements, computer end stations, etc.). Customer computer end stations (e.g., workstations, laptops, palm tops, mobile phones, etc.) access content/services provided over the Internet and/or content/services provided on associated networks such as the Internet. The content and/or services are typically provided by one or more server computing end stations belonging to a service or content provider, and may include public webpages (free content, store fronts, search services, etc.), private webpages (e.g., username/password accessed webpages providing email services, etc.), corporate networks over VPNs, etc. Typically, customer computing end stations are coupled (e.g., through customer premise equipment coupled to an access network, wirelessly to an access network) to edge network elements, which are coupled through core network elements of the Internet to the server computing end stations.

In the following figures, like reference numbers are used to represent like elements.

Diameter Routing Agents (DRAs) available today provide only basic functionalities typically defined in hard coding or scripting. As such, users may typically not be empowered to easily and flexibly define more complex behaviors for a DRA. In view of the foregoing, it would be desirable to provide a method and system that facilitates user definition and extension of DRA message processing behavior.

FIG. 1 illustrates an exemplary network environment 100 for a Diameter Routing Agent (DRA) 142. Exemplary network environment 100 may be a subscriber network for providing various services. In various embodiments, subscriber network 100 may be a public land mobile network (PLMN). Exemplary subscriber network 100 may be telecommunications network or other network for providing access to various services. Exemplary subscriber network 100 may include user equipment 110, base station 120, evolved packet core (EPC) 130, packet data network 150, and application function (AF) 160.

User equipment 110 may be a device that communicates with packet data network 150 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, tablet, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by the relevant 3GPP standards. Thus, base station 120 may be a device that communicates with user equipment 110 via a first medium, such as radio waves, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with EPC 130. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the relevant 3GPP standards. EPC 130 may include a serving gateway (SGW) 132, a packet data network gateway (PGW) 134, and a session control device 140

Serving gateway (SOW) 132 may be a device that provides gateway access to the EPC 130. SGW 132 may be one of the first devices within the EPC 130 that receives packets sent by user equipment 110. Various embodiments may also include a mobility management entity (MME) (not shown) that receives packets prior to. SGW 132. SGW 132 may forward such packets toward PGW 134. SGW 132 may perform a number of functions such as, for example, managing mobility of user equipment 110 between multiple base stations (not shown) and enforcing particular quality of service (QoS) characteristics for each flow being served. In various implementations, such as those implementing the Proxy Mobile IP standard, SGW 132 may include a Bearer Binding and Event Reporting Function (BBERF). In various exemplary embodiments, EPC 130 may include multiple SGWs (not shown) and each SGW may communicate with multiple base stations (not shown).

Packet data network gateway (POW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Therefore, PGW 134 may be a policy and charging enforcement node (PCEN). PGW 134 may include a number of additional features such as, for example, packet filtering, deep packet inspection, and subscriber charging support. PGW 134 may also be responsible for requesting resource allocation for unknown application services.

Session control device 140 may be a device that provides various management or other functions within the EPC 130. For example, session control device 140 may provide a Policy and Charging Rules Function (PCRF). In various embodiments, session control device 140 may include an Alcatel Lucent 5780 Dynamic Services Controller (DSC). Session control device 140 may include a DRA 142, a plurality of policy and charging rules blades (PCRBs) 144, 146, and a subscription profile repository.

As will be described in greater detail below, DRA 142 may be an intelligent Diameter Routing Agent. As such, DRA 142 may receive, process, and transmit various Diameter messages. DRA 142 may include a number of user-define rules that govern the behavior of DRA 142 with regard to the various Diameter messages DRA 142 may encounter. Based on such rules, the DRA 142 may operate as a relay agent, proxy agent, or redirect agent. For example, DRA 142 may relay received messages to an appropriate recipient device. Such routing may be performed with respect to incoming and outgoing messages, as well as messages that are internal to the session control device.

Policy and charging rules blades (PCRB) 144, 146 may each be a device or group of devices that receives requests for application services, generates PCC rules, and provides PCC rules to the PGW 134 or other PCENs (Path Computational Element Nodes) (not shown). PCRBs 144, 146 may be in communication with AF 160 via an Rx interface. As described in further detail below with respect to AF 160, PCRB 144, 146 may receive an application request in the form of an Authentication and Authorization Request (AAR) from AF 160. Upon receipt of an AAR, PCRB 144, 146 may generate at least one new PCC rule for fulfilling the application request.

PCRB 144, 146 may also be in communication with SGW 132 and PGW 134 via a Gxx and a Gx interface, respectively. PCRB 144, 146 may receive an application request in the form of a credit control request (CCR) from SGW 132 or PGW 134. As with an AAR, upon receipt of a CCR, PCRB 144, 146 may generate at least one new PCC rule for fulfilling the application request. In various embodiments, the AAR and the CCR may represent two independent application requests to be processed separately, while in other embodiments, the AAR and the CCR may carry information regarding a single application request and PCRB 144, 146 may create at least one PCC rule based on the combination of the AAR and the CCR. In various embodiments, PCRB 144, 146 may be capable of handling both single-message and paired-message application requests.

Upon creating a new PCC rule or upon request by the PGW 134, PCRB 144, 146 may provide a PCC rule to PGW 134 via the Gx interface. In various embodiments, such as those implementing the PMIP standard for example, PCRB 144, 146 may also generate QoS rules. Upon creating a new QoS rule or upon request by the SGW 132, PCRB 144, 146 may provide a QoS rule to SGW 132 via the Gxx interface.

Subscription profile repository (SPR) 148 may be a device that stores information related to subscribers to the subscriber network 100. Thus, SPR 148 may include a machine-readable storage medium such as read-only memory (ROM), random-access memory (RAM), magnetic disk storage media, optical storage media, flash-memory devices, and/or similar storage media. SPR 148 may be a component of one of PCRB 144, 146 or may constitute an independent node within EPC 130 or session control device 140. Data stored by SPR 138 may include subscription information such as identifiers for each subscriber, bandwidth limits, charging parameters, and subscriber priority.

Packet data network 150 may be any network for providing data communications between user equipment 110 and other devices connected to packet data network 150, such as AF 160. Packet data network 150 may further provide, for example, phone or Internet service to various user devices in communication with packet data network 150.

Application function (AF) 160 may be a device that provides a known application service to user equipment 110. Thus, AF 160 may be a server or other device that provides, for example, a video streaming or voice communication service to user equipment 110. AF 160 may further be in communication with the PCRB 144, 146 of the EPC 130 via an Rx interface. When AF 160 is to begin providing known application service to user equipment 110, AF 160 may generate an application request message, such as an authentication and authorization request (AAR) according to the Diameter protocol, to notify the PCRB 144, 146 that resources should be allocated for the application service. This application request message may include information such as an identification of the subscriber using the application service, an IP address of the subscriber, an APN for an associated IP-CAN session, or an identification of the particular service data flows that must be established in order to provide the requested service.

As will be understood, various Diameter applications may be established within subscriber network 100 and supported by DRA 142. For example, an Rx application may be established between AF 160 and each of PCRBs 144, 146. As another example, an Sp application may be established between SPR 148 and each of PCRBs 144, 146. As yet another example, an S9 application may be established between one or more of PCRBs 144, 146 and a remote device implementing another PCRF (not shown). As will be understood, numerous other Diameter applications may be established within subscriber network 100.

In supporting the various potential Diameter applications, DRA 142 may receive Diameter messages, process the messages, and perform actions based on the processing. For example, DRA 142 may receive a Gx CCR from PGW 134, identify an appropriate PCRB 144, 146 to process the Gx CCR, and forward the Gx CCR to the identified PCRB 144, 146. DRA 142 may also act as a proxy by modifying the subsequent Gx CCA sent by the PCRB 144, 146 to carry an origin-host identification pointing to the DRA 142 instead of the PCRB 144, 146. Additionally or alternatively, DRA 142 may act as a redirect agent or otherwise respond directly to a request message by forming an appropriate answer message and transmitting the answer message to an appropriate requesting device.

Figure 2:
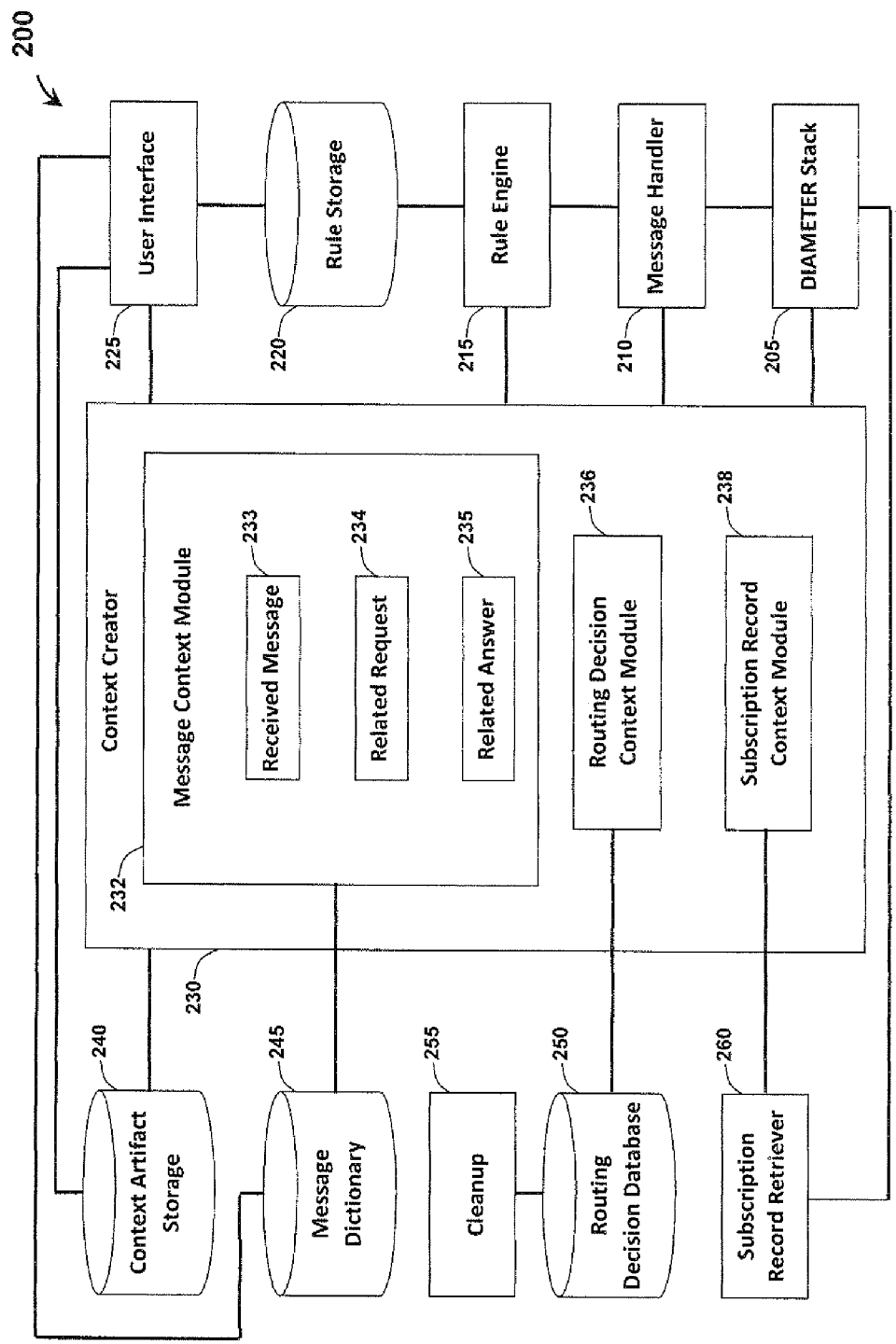
FIG. 2 illustrates an exemplary Diameter Routing Agent.

FIG. 2 illustrates an exemplary Diameter Routing Agent (DRA) 200. DRA 200 may be a standalone device or a component of another system. For example, DRA 200 may correspond to DRA 142 of exemplary environment 100. In such an embodiment, DRA 142 may support various Diameter applications defined by the 3GPP such as Gx, Gxx, Rx, or Sp. It will be understood that DRA 200 may be deployed in various alternative embodiments wherein additional or alternative applications are supported. As such, it will be apparent that the methods and systems described herein may be generally applicable to supporting any Diameter applications.

DRA 200 may include a number of components such as Diameter stack 205, message handler 210, rule engine 215, rule storage 220, user interface 225, context creator 230, context artifact storage 240, message dictionary 245, routing decision database 250, cleanup module 255, or subscription record retriever 260.

Diameter stack 205 may include hardware or executable instructions on a machine-readable storage medium configured to exchange messages with other devices according to the Diameter protocol. Diameter stack 205 may include an interface including hardware or executable instructions encoded on a machine-readable storage medium configured to communicate with other devices. For example, Diameter stack 205 may include an Ethernet or TCP/IP interface. In various embodiments, Diameter stack 205 may include multiple physical ports.

Diameter stack 205 may also be configured to read and construct messages according to the Diameter protocol. For example, Diameter stack may be configured to read and construct CCR, CCA, AAR, AAA, RAR, and RAA messages. Diameter stack 205 may provide an application programmers interface (API) such that other components of DRA 200 may invoke functionality of Diameter stack. For example, rule engine 215 may be able to utilize the API to read an attribute-value pair (AVP) from a received CCR or to modify an AVP of a new CCA. Various additional functionalities will be apparent from on the following description.

Message handler 210 may include hardware or executable instructions on a machine-readable storage medium configured to interpret received messages and invoke rule engine 215 as appropriate. In various embodiments, message handler 210 may extract a message type from a message received by Diameter stack 205 and invoke the rule engine using a rule set that is appropriate for the extracted message type. For example, the message type may be defined by the application and command of the received message. After evaluating one or more rules, rule engine 215 may pass back an action to be taken or a message to be sent. Message handler 210 may then transmit one or more messages via Diameter stack, as indicated by the rule engine 215.

Rule engine 215 may include hardware or executable instructions on a machine-readable storage medium configured to process a received message by evaluating one or more rules stored in rule storage 220. As such, rule engine 215 may be a type of processing engine. Rule engine 215 may retrieve one or more rules, evaluate criteria of the rules to determine whether the rules are applicable, and specify one or more result of any applicable rules. For example, rule engine 215 may determine that a rule is applicable when a received Gx CCR includes a destination-host AVP identifying DRA 200. The rule may specify that the destination-host AVP should be changed to identify a PCRB before the message is forwarded.

Rule storage 220 may be any machine-readable medium capable of storing one or more rules for evaluation by rule engine 215. Accordingly, rule storage 220 may include a machine-readable storage medium such as read-only memory (ROM), random-access memory (RAM), magnetic disk storage media, optical storage media, flash-memory devices, and/or similar storage media. In various embodiments, rule storage 220 may store one or more rule sets as a binary decision tree data structure. Various other data structure for storing a rule set will be apparent.

It will be understood that, while various components are described as being configured to perform functions such as evaluating rules or accessing context objects based on rules, such configurations may not require any rules to be present in rule storage. For example, rule engine 215 may be configured to evaluate a rule including a context object reference even if no such rule is stored in rule storage 220. Thereafter, if a user adds such a rule to rule storage, rule engine 215 may process the rule as described herein. In other words, as used herein, the phrase "configured to" when used with respect to functionality related to rules will be understood to mean that the component is capable of performing the functionality as appropriate, regardless of whether a rule that requests such functionality is actually present.

User interface 225 may include hardware or executable instructions on a machine-readable storage medium configured to enable communication with a user. As such, user interface 225 may include a network interface (such as a network interface included in Diameter stack 205), a monitor, a keyboard, or a mouse. User interface 225 may also provide a graphical user interface (GUI) for facilitating user interaction. User interface 225 may enable a user to customize the behavior of DRA 200. For example, user interface 225 may enable a user to define rules for storage in rule storage 220 and evaluation by rule engine 215. Various additional methods for a user to customize the behavior of DRA 200 via user interface 225 will be apparent to those of skill in the art.

According to various embodiments, rule storage 220 may include rules that reference one or more "contexts" or "context objects." In such embodiments, context creator 230 may include hardware or executable instructions on a machine-readable storage medium configured to instantiate context objects and provide context object metadata to requesting components. Context objects may be instantiated at run time by context creator 230 and may include attributes or actions useful for supporting the rule engine 215 and enabling the user to define complex rules via user interface 225. For example, context creator 230 may provide context objects representing various Diameter messages, previous routing decisions, or subscription profiles.

Upon DRA 200 receiving a Diameter message to be processed, message handler 210 may send an indication to context creator 230 that the appropriate context objects are to be instantiated. Context creator 230 may then instantiate such context objects. In some embodiments, context creator 230 may instantiate all known context objects or may only instantiate those context objects actually used by the rule set to be applied by rule storage 220. In other embodiments, context creator 230 may not instantiate a context object until it is actually requested by the rule engine 215.

Context creator 230 may additionally facilitate rule creation by providing context metadata to user interface 225. In various embodiments, context creator 230 may indicate to user interface which context objects may be available for a rule set being modified and what attributes or actions each context object may possess. Using this information, user interface 225 may present a point-and-click interface for creating complex rules. For example, user interface 225 may enable the user to select a desired attribute or action of a context object from a list for inclusion in a rule under construction or modification.

Context creator 230 may rely on one or more context artifacts stored in context artifact storage 240 in establishing context objects. As such, context artifact storage 240 may be any machine-readable medium capable of storing one or more context artifacts. Accordingly, context artifact storage 240 may include a machine-readable storage medium such as read-only memory (ROM), random-access memory (RAM), magnetic disk storage media, optical storage media, flash-memory devices, and/or similar storage media. Context artifact storage 240 may store artifacts in various forms such as, for example, run-time libraries. In various embodiments, such run-time libraries may be stored as Java archive (.jar) files.

Each context artifact may define the attributes or actions available for a context object. In various embodiments, the context artifact may define one or more functions to be executed when an attribute or action is accessed. Such functions may utilize other functionality of the DRA 200, such as accessing the API of the Diameter stack, or may return values to the component that called the attribute or action. The context artifact may also include tags or other metadata for context creator 230 to provide to user interface 225 for describing the actions and attributes of the context object. In exemplary DRA 200, context artifact storage 240 may store context artifacts defining a message context, a routing decision context, or a subscription record context. These context artifacts may be used by context creator 230 at run-time to instantiate different types of context objects. As such, context creator 230 may be viewed as including a message context module 232, a routing decision context module 236, and a subscription record context module 238. In various embodiments, a user may be able to define new context artifacts via user interface 225 for storage in context artifact storage.

Message context module 232 may represent the ability of context creator 230 to generate context objects representing and providing access to Diameter messages. For example, message context module 232 may generate a context object representing the received message. In various embodiments, message context module 232 may also be configured to generate a context object representing a request message or an answer message associated with the received Diameter message, as appropriate. As such, message context module 232 may be viewed as including a received message submodule 233, a related request submodule 234, and a related answer submodule 235.

The contents of Diameter messages may vary depending on the application and command type. For example, an RX RAA message may include different data from a GX CCR message. Such differences may be defined by various standards governing the relevant Diameter applications. Further, some vendors may include proprietary or otherwise non-standard definitions of various messages. Message context module 232 may rely on message definitions stored in message dictionary 245 to generate message contexts for different types of Diameter messages. For example, upon receiving a Diameter message, message handler may pass the application and command type to the context creator. Message context module 232 may then locate a matching definition in message dictionary. This definition may indicate the AVPs that may be present in a message of the specified type. Message context module 232 may then instantiate a message context object having attributes and actions that match the AVPs identified in the message definition.

Message dictionary 245 may be any machine-readable medium capable of storing one or more context artifacts. Accordingly, message dictionary 245 may include a machine-readable storage medium such as read-only memory (ROM), random-access memory (RAM), magnetic disk storage media, optical storage media, flash-memory devices, and/or similar storage media. Message dictionary 245 may include various message definitions in appropriate forms such as, for example, XML files. Message dictionary 245 may include a number of predefined definitions included with the DRA 200 by a supplier. In various embodiments, a user may be able to provide new, user-defined message definitions via user interface 225. For example, if the user wishes to support an application not already defined by the predefined definitions, the user may generate or otherwise obtain a definition file for storage in message dictionary. In various embodiments, the user-defined definitions may be stored in a different portion of message dictionary from the predefined definitions.

In various embodiments, the user may also be able to extend predefined definitions via user interface 225. The user may be able to provide extension definitions that define new AVPs or specify additional AVPs to occur in a particular message type. For example, a user may wish to support a proprietary AVP within an Rx AAR. To provide such support, the user may provide a definition file, such as an XML file, defining the proprietary AVP and indicating that the proprietary AVP may be present in an Rx AAR. Such extension definitions may also be stored in a different area of message dictionary 245 from the predefined definitions. Message context module 232 may be configured to apply any applicable extension definitions when instantiating a new message context object or providing context metadata to user interface 225.

As noted above, upon receiving a Diameter message, message handler 210 may extract the application and command type and pass this information to context creator 230, which then may locate any applicable definitions to instantiate a new received message context object. Received message submodule 233 may be further configured to associate the new context object with the received Diameter message itself. For example, received message submodule 233 may copy the received Diameter message from Diameter stack 205 into a private or protected variable. Alternatively, received message submodule 233 may store an identification of the Diameter message useful in enabling access to the Diameter message via the API of the Diameter stack 205.

In various embodiments, DRA 200 may support the use of inverse message contexts. In such embodiments, upon extracting the command type from the received Diameter message, message handler 210 may identify the inverse command type as well. In some such embodiments, message handler 210 may implement a look-up table identifying the inverse for each message command. For example, upon determining that a received Diameter message is a Gx CCR, the message handler may determine that the inverse message would be a Gx CCA. Message handler 210 may pass this information to context creator 230 as well.

Upon receiving an inverse message type, message context module 232 may instantiate an inverse message context object in a manner similar to that described above with regard to the received message context object. Related request submodule 234 or related answer submodule 235, as appropriate, may also associate the new context object with message data. If the inverse message is a request message, related request module 234 may identify a previously-processed request message stored in Diameter stack 205 and associate the message with the new context object in a manner similar to that described above. In various embodiments, upon receiving an answer message, Diameter stack 205 may locate the previously-processed and forwarded request message to which the answer message corresponds. Diameter stack 205 may present this related request message through the API for use by context creator 230 or other components of DRA 200. By associating the previous request message with the related request context object, rule engine 215 may be provided with attributes capable of accessing the AVPs carried by the request message that prompted transmission of the answer message being processed.

When the inverse message is an answer message, on the other hand, related answer module 235 may construct a new answer message by, for example, requesting Diameter stack 205 construct the message via the API. The new answer message may be completely blank or may include at least some values copied over from the received Diameter request message. Related answer module 235 may associate the new context object with the new answer message in a manner similar to that described above with respect to received message module 233. The related answer context object may then provide rule engine 215 with access to various actions capable of modifying the new answer message. For example, the rule engine may utilize an action of the related answer context object to set a result-code AVP of the answer message, thereby indicating to the message handler 210 that the answer should be sent back to the device that sent the received request. Message handler 210 may also then refrain from forwarding the received request message to any other devices.

As noted above, context creator 230 may be capable of defining other context objects that do not represent a Diameter message. Such context objects may be referred to as "computational contexts" and may also be defined by contexts artifacts in context artifact storage 240. As an example, routing decision context module 236 may be configured to instantiate a routing decision context object. Such routing decision context may identify, for each received Diameter message, a previously made routing decision that may be applicable to the received message. Such previously made routing decisions may be stored in routing decision database 250 along with a session identifier for correlating received messages to previously-processed messages. Routing decision database 250 may be any machine-readable medium capable of storing such routing decisions. Accordingly, routing decision database 250 may include a machine-readable storage medium such as read-only memory (ROM), random-access memory (RAM), magnetic disk storage media, optical storage media, flash-memory devices, and/or similar storage media.

Computational contexts may be supported by other DPA 200 functionality. For example, DPA 200 may include a cleanup module 255 that periodically removes stale entries from routing decision database 250. In some embodiments, the routing decision context object may not interact directly with cleanup module 255. Instead, cleanup module 255 may operate independently, while affecting the behavior of the routing decision context object indirectly by modifying the contents of routing decision database 250.

As another example of a computational context, subscription record context module 238 may generate a subscription record context object. The subscription record context object may utilize other DRA 200 functionality, such as subscription record retriever 260, to retrieve a subscription record for received Diameter messages. Subscription record retriever 260 may include hardware or executable instructions on a machine-readable storage medium configured to communicate with a subscription profile repository (SPR) via Diameter stack 205 to retrieve a subscription record for a Diameter message. Such communication may be performed, for example, according to the Sp application. Various methods of implementing subscription record retriever 260 will be apparent. Through this retrieval of a subscription record, the subscription record context object may provide the rule engine 215 with access to the subscription record It should be noted that while rule storage 220, context artifact storage 240, message dictionary 245, and routing decision database 250 are illustrated as separate devices, one or more of these components may be resident on multiple storage devices. Further, one or more of these components may share a storage device. For example, rule storage, context artifact storage 240, message dictionary 245, and routing decision database 250 may all refer to portions of the same hard disk or flash memory device.

Figure 3:
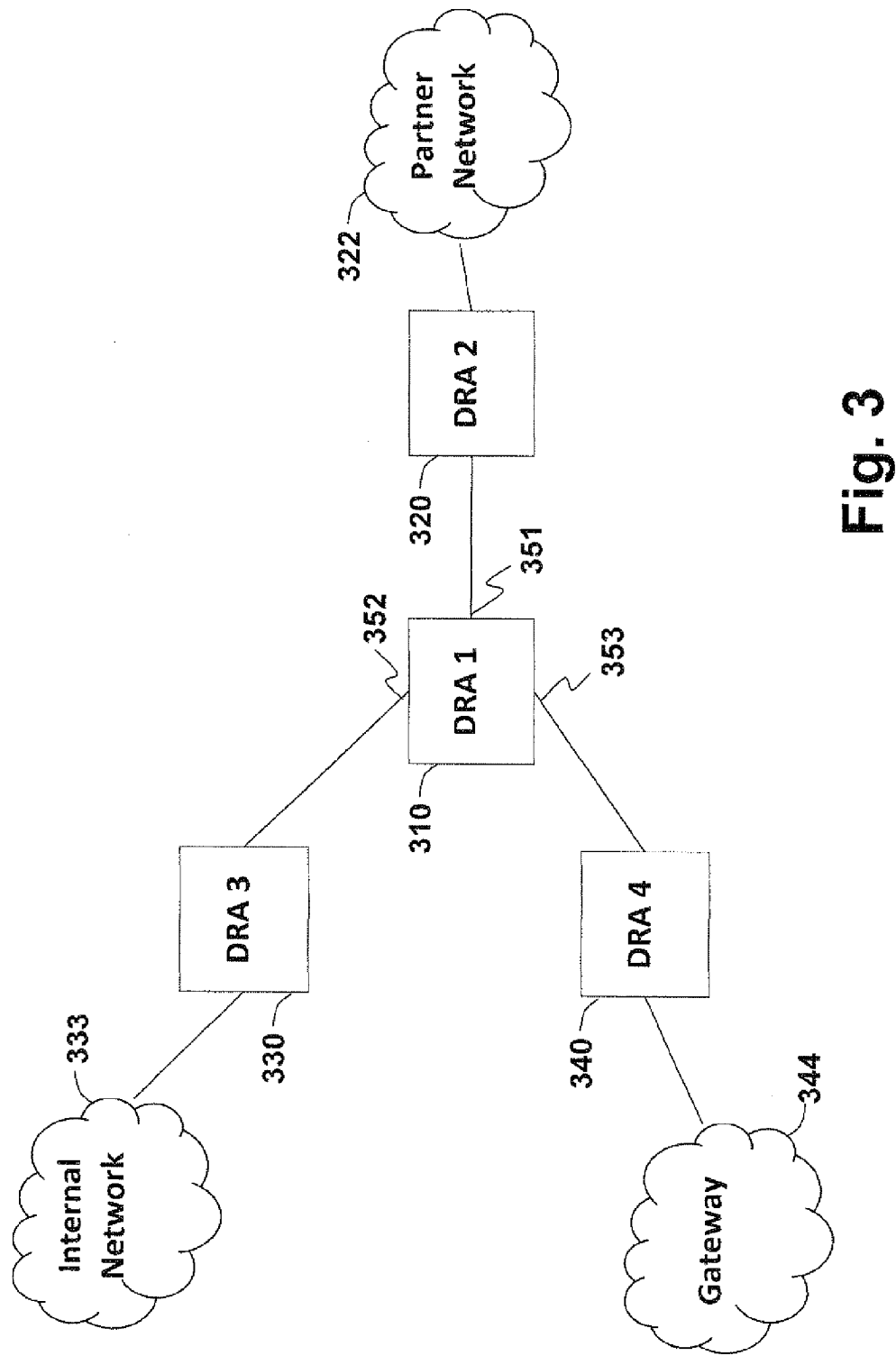
FIG. 3 illustrates diagram of a DIAMETER network according to an embodiment of the invention.

FIG. 3 illustrates a network diagram of a portion of a DIAMETER network according to an embodiment of the invention having a number of connected DIAMETER Routing Agents (DRAB). In this portion of the DIAMETER network, DRA-1 310 has three peers, DRA-2 320, DRA-3 330, and DRA-4 340.

In this exemplary subnetwork, message requests are passed from DRA-1 310 to its peers. DRA-1 310 associates a timeout value with each of the peers it is connected to according to the expected response time of the peer.

For example, DRA-4 340 is connected to Gateway network 344 and the timeout may be set to a very low value since Gateway network 344 is the control plane and expected to be very fast in its responses to requests.

For peer DRA-3 330, the response time to requests may be expected to be a bit longer, and therefore be associated with a higher timeout value, as the associated devices are part of the local network, but are not in the control plane.

Finally, for peer DRA-2 320, the response time to requests may be expected to be longer still, and therefore associated with an even higher timeout value, since the traffic may be going to roaming partners whose networks may be on another continent.

In general, in operation, when a request is sent or forwarded to or forwarded through DRA-1 310 to a peer, a timer with the associated timeout for that peer is scheduled. Should the timer expire before the response is received an appropriate action is taken. This may consist of resending the request, or concluding that no response is forthcoming and generating a response locally to send to the request originating node consisting of a result code of "DIAMETER_UNABLE_TO_DELIVER".

A number of alternative embodiments are possible.

According to one embodiment a method denoted as a "timer wheel' is employed. This method is particularly appropriate in contexts where the potential quantity of outstanding messages makes it inefficient or prohibitive to maintain a timer per message, in particular in those contexts wherein the quantity of messages may be in the tens or hundreds of thousands. With this method, many messages are associated to a single timer and as a result the time granularity of "expired" is more coarse.

By way of example, a particular timer wheel associated with this method may have a granularity interval of 50 ms. When a request is sent, it is associated with a timer for the current 50 ms interval. As a result, the expiry time for a particular request would be equal to the request plus up to the granularity value. Thus, a request having an associated timeout of 100 ms and being associated with a timer with a granularity of 50 ms could result in an actual timeout in the range 100 ms to 150 ms.

According to another embodiment, for example, instead of a timeout being associated with peers DRA-2 320, DRA-3 330, and DRA-4 340, the DIAMETER node DRA-1 310 could have timeouts associated with the egress IP address for the associated peers. This would be the egress IP addresses 351, 352, and 353 of FIG. 3 respectively.

According to another contemplated embodiment, DIAMETER node DRA-1 310 could have respective timeout values associated on a per-host basis. This would require a great amount of additional configuration and would allow timeout customization to very specific levels.

Similarly, according to yet another contemplated embodiment, DIAMETER node DRA-1 310 could have respective timeout values configured and associated on a per-realm basis. This would require few configurations than a per-host basis, yet still more than a per-peer basis.

One of the advantages of policing timeouts at the DRA node is that it allows individual devices connected to the DIAMETER network to use large, tolerant timeout values. As the DRA assigned timeout is chosen for the expected response time, in the event that an individual device is using a large timeout value, the DRA timer will expire first and the DRA can respond, first by resending the request itself—thus saving network hops and the associated bandwidth usage. Second the DRA may respond with a response failure message such as "DIAMETER_UNABLE_TO_DELIVER" which allows the individual device to then respond without having to wait for its timeout value to expire.

Figure 4:
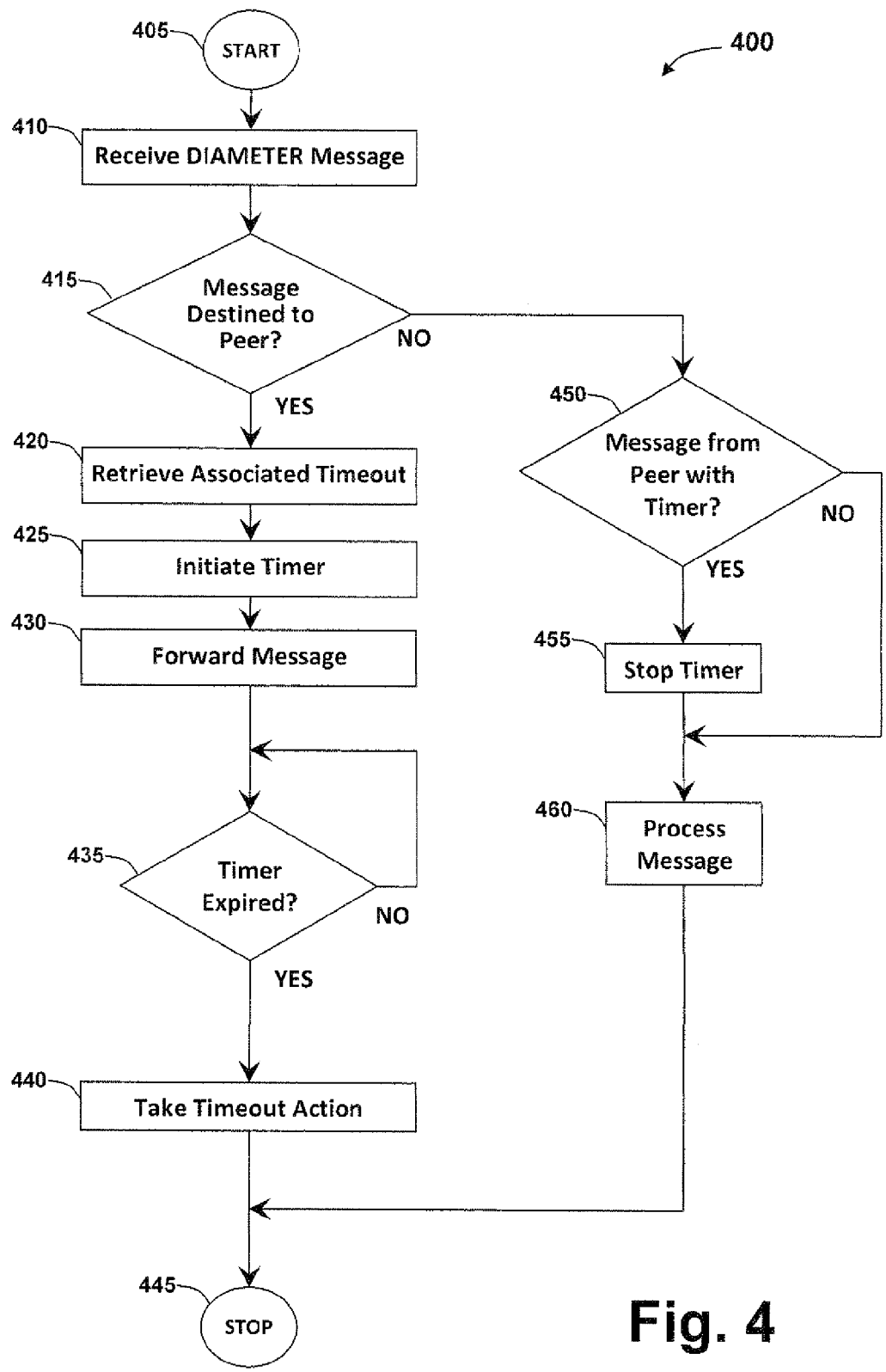
FIG. 4 illustrates a flowchart of a method of handling timeouts according to an embodiment of the invention.

Referring now to FIG. 4 there is illustrated an exemplary method 400 for handling associating timeouts with DIAMETER messages destined for peer of a DRA according to an embodiment of the invention.

Method 400 may start at step 405 and proceed to step 410 whereat a DIAMETER message is received. At step 415 the message is evaluated as to whether it is a request with a destination associated with a peer. In the event that the test results are affirmative, the method moves to step 420 whereat a timeout associated to that peer is retrieved. This associated timeout is used to initiate a timeout counter at step 425 and the request message is forwarded to the peer at step 430.

At step 435 a timer loop is entered which is maintained until the timer expires. Once the timer has expired, a timeout action is taken at step 440 and the method may then proceed to step 445 and stop.

The timeout action taken at step 440 is pre-established and may consist among other actions, for example of resending the request to the peer and restarting the timer, and noting that the request has already failed at least once; or as another example, of no longer expecting a response and generating a response to the message originating node with a result code such as "DIAMETER_UNABLE_TO_DELIVER".

If at step 415 it was determined that the DIAMETER message was not a request message destined for transmission to a peer, control proceeds to step 450 where a determination is made as to whether the DIAMETER message is a response message from a peer with an associated timeout timer which is running.

If the answer to the determination in step 450 is affirmative, then at step 455 the associated timeout timer is cancelled. Control then proceeds to step 460 whereat the message is appropriately processed and then to step 445 and stop.

If the answer to the determination in step 450 is negative, control then proceeds to step 460 whereat the message is appropriately processed and then to step 445 and stop.

By this method request messages traversing the DRA node have appropriate timeout values associated with the peers they are destined for. Upon the return response the timeout counter is cancelled. If the timeout timer expires, then it may be expected that a response will not be forthcoming from that peer and an appropriate action may be taken.

Figure 5:
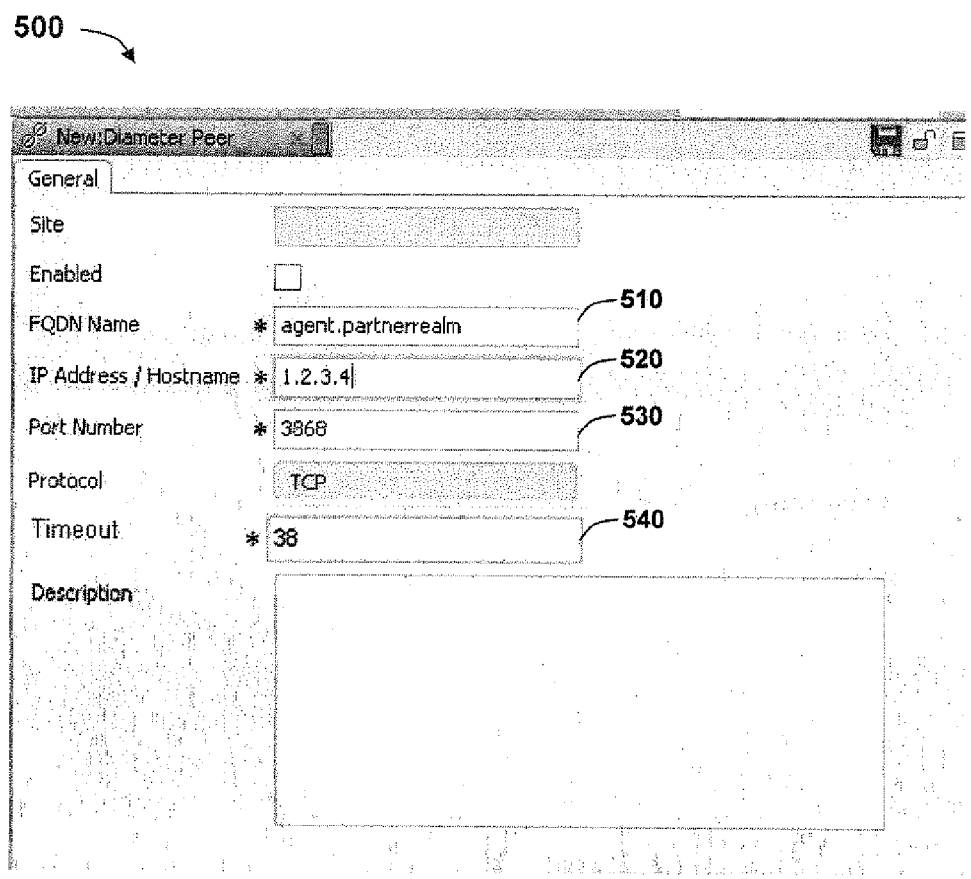
FIG. 5 illustrates a screenshot of a Graphical User Interface for associating specific timeout values on a per-peer basis.

Referring now to FIG. 5 there may be seen a screenshot 500 of a Graphical User Interface by which specific appropriate timeout values may be associated with peers of a DRA. The Graphical User Interface could be, for example, part of the user interface 225 of FIG. 2.

The Graphical User Interface provides input points at 510, 520 and 530 respectively for entering the name, IP address and port number of a peer. An appropriate timeout timer value may be entered at 540. In the example given the timeout value is in milliseconds.

Therefore what has been disclosed is a method of associating and assigning specific timeout values to on a per-peer basis to peers of a DIAMETER Routing Agent in a DIAMETER network.

Note, in the preceding discussion a person of skill in the art would readily recognize that steps of various above-described methods can be performed by appropriately configured network processors. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices are all tangible and non-transitory storage media and may be, e.g., digital memories, magnetic storage media such as a magnetic disks and magnetic tapes, hard drives, or optically readable digital data storage media. The embodiments are also intended to cover network element processors programmed to perform said steps of the above-described methods.

Numerous modifications, variations and adaptations may be made to the embodiment of the invention described above without departing from the scope of the invention, which is defined in the claims.

What is claimed is:

1. A method performed by a DIAMETER Routing Agent (DRA) for processing a DIAMETER message associated with a peer of said DRA, the method comprising:
   receiving said DIAMETER message at the DRA;
   testing if said DIAMETER message is a request message destined for an associated peer, and if said test is affirmative, then
   retrieving a preset timeout associated with that peer;
   initiating a timeout timer with said preset timeout; and
   forwarding said DIAMETER request message to said peer.

2. The method as claimed in claim 1, wherein, after said timeout timer times out, taking a preselected timeout action.

3. The method as claimed in claim 2, wherein said preselected timeout action comprises:
   resending said DIAMETER request message to said peer;
   restarting a timeout counter with said preset timeout; and
   flagging that the timeout timer has expired once.

4. The method as claimed in claim 2, wherein said preselected timeout action comprises:
   sending an unable_to_deliver response message.

5. The method as claimed in claim 1, wherein, after a negative result of the test step,
   testing if said DIAMETER message is a response message from a peer with a running timeout timer, and if an answer is affirmative then,
   stopping said running timeout timer; and
   processing said response message.

6. The method as claimed in claim 5, wherein, after a negative result of the test step of whether said DIAMETER message is a response message, then
   processing said response message.

7. A non-transitory machine readable storage medium encoded with instructions for execution by a DIAMETER Routing Agent (DRA) for processing a DIAMETER message associated with a peer of said DRA, the non-transitory machine readable storage medium comprising:
   instructions for receiving a DIAMETER message at the DRA;
   instructions for testing if said DIAMETER message is a request message destined for an associated peer, and if said test is affirmative, then instructions for retrieving a preset timeout associated with that peer;

instructions for initiating a timeout timer with said preset timeout; and instructions for forwarding said DIAMETER request message to said peer.

8. The method of claim 1, wherein the DRA supports use of inverse message contexts.

9. The method of claim 1, further comprising:
associating a timeout value with each peer.

10. The method of claim 9, wherein the timeout value is associated according to an expected response time of each peer.

11. The method of claim 9, wherein the timeout value is associated with egress IP addresses of each peer.

12. The method of claim 1, further comprising:
associating timeout values on a per-host basis.

13. The method of claim 1, further comprising:
associating timeout values on a per-realm basis.

* * * * *